United States Patent
Smartt (10) Patent No.: US 7,957,893 B2
(45) Date of Patent: Jun. 7, 2011

(54) METHODS AND SYSTEMS FOR DEDUCING ROAD GEOMETRY AND CONNECTIVITY

(75) Inventor: Brian Smartt, Sunnyvale, CA (US)

(73) Assignee: Dash Navigation, Inc., Mountain View, CA (US)

( * ) Notice: Subject to any disclaimer, the term of this patent is extended or adjusted under 35 U.S.C. 154(b) by 900 days.

(21) Appl. No.: 11/292,392

(22) Filed: Nov. 30, 2005

(65) Prior Publication Data

US 2006/0155464 A1    Jul. 13, 2006

Related U.S. Application Data

(60) Provisional application No. 60/632,276, filed on Nov. 30, 2004.

(51) Int. Cl.
*G01C 21/30* (2006.01)
*G01C 21/32* (2006.01)

(52) U.S. Cl. ............ 701/208; 701/55; 701/56; 701/201; 701/205; 701/212

(58) Field of Classification Search .............. 701/208, 701/212, 55, 56, 201, 204, 205, 213; 340/995.11, 340/995.12, 995.14, 995.15, 995.19, 286.14, 340/539.2; 342/191, 25, 357.13, 64; 345/584, 345/587; 434/147, 150, 153; 711/206, 723
See application file for complete search history.

(56) References Cited

U.S. PATENT DOCUMENTS

| | | | |
|---|---|---|---|
| 5,016,007 A * | 5/1991 | Iihoshi et al. ............ 340/995.22 |
| 5,164,904 A | 11/1992 | Sumner | |
| 5,543,789 A | 8/1996 | Behr et al. | |
| 6,101,390 A * | 8/2000 | Jayaraman et al. ........ 455/456.1 |
| 6,128,571 A * | 10/2000 | Ito et al. ........................ 701/201 |
| 6,236,933 B1 * | 5/2001 | Lang ............................... 701/117 |
| 6,311,126 B1 * | 10/2001 | Katayama et al. ............ 701/208 |
| 6,333,703 B1 * | 12/2001 | Alewine et al. .......... 340/995.13 |
| 6,560,532 B2 * | 5/2003 | Cayford ......................... 701/209 |
| 2004/0198254 A1* | 10/2004 | Mizui et al. ..................... 455/99 |
| 2006/0047423 A1* | 3/2006 | Min .............................. 701/209 |

FOREIGN PATENT DOCUMENTS

| | | |
|---|---|---|
| DE | 19701370 A1 | 7/1997 |
| EP | 0377480 A | 7/1990 |
| EP | 0715286 A | 6/1996 |
| EP | 0752692 A | 1/1997 |
| EP | 0755039 A | 1/1997 |
| EP | 0921509 A | 6/1999 |
| WO | WO 9729470 A | 8/1997 |

OTHER PUBLICATIONS

F. W. Cathey et al, "Transit vehicles as traffic probe sensors", Intelligent Transportation Systems, Aug. 25, 2001, pp. 579-584, Piscataway, NJ, USA.

* cited by examiner

*Primary Examiner* — Khoi Tran
*Assistant Examiner* — Jorge O Peche
(74) *Attorney, Agent, or Firm* — Novak Druce + Quigg LLP (57) ABSTRACT

Methods and systems for generating, deriving, and enhancing drivable road databases are provided. A baseline road in a road network is defined and position and/or trajectory data collected by vehicles traveling the baseline road are compiled and compared to a representation of the baseline road in an existing database. Identity and/or other property information about the road are assigned form the existing database to the new database.

3 Claims, 8 Drawing Sheets

METHODS AND SYSTEMS FOR DEDUCING ROAD GEOMETRY AND CONNECTIVITY

RELATED APPLICATIONS

This application claims the priority of U.S. Provisional Application for Patent Ser. No. 60/632,276, filed 30 Nov. 2004. This application is related to copending U.S. patent application Ser. Nos. 10/272,039, entitled "Enhanced Mobile Communication Device, and Transportation Application Thereof;" Ser. No. 10/436,967, entitled "Hierarchical Floating Car Data Network;" Ser. No. 10/436,926, entitled "Methods for Communicating between Elements in a Hierarchical Floating Car Data Network;" Ser. No. 10/437,205, entitled "Enhanced Mobile Communication Device with Extended Radio, and Applications;" and Ser. No. 10/436,691, entitled "Enhanced Dead Reckoning Method," the disclosures of which are incorporated herein by reference.

BACKGROUND OF THE INVENTION

1. Field of the Invention

The present invention relates generally to the field of road navigation databases. More specifically, the present invention is directed toward a method for developing and/or progressively refining a database of road connectivity and drivability in a road network using position and/or heading information from vehicles traveling the road network.

2. Description of Related Art

Commercially available automated navigation assistance products generally utilize a computer database representing navigable roads and their interconnections in combination with software that selects one or more routes between the a starting location and a desired destination. A variety of methods may be employed to develop the database. For example, aerial photographs may be digitized and the identified roads identified by sending human observers to drive the mapped roads to assign names, etc. Most currently available methods for developing navigation databases are generally labor intensive and therefore involve substantial development costs and/or limitations in accuracy and "drivability" of the resultant database.

One example of a database of urban area roads in the United States is the Federal Government's Topologically Integrated Geographic Encoding and Referencing system (TIGER). The TIGER database was developed by the U.S. Census bureau by scanning 1:100,000 scale U.S. Geological Survey (USGS) topographic maps. A significant objective of the Census Bureau in developing the TIGER database was accurate representation of political districting boundaries. As such, while the database lacks absolute positional accuracy for many roads, the relative placement of roads represented by the database is fairly reliable. The TIGER database includes most residential and commercial roads along with their names, a representative topology, and approximate locations of address numbers. Additionally, the database is kept reasonably current, particularly in larger urban areas. Because the database is a product of the U.S. government, and thus not copyrighted, it may be used without obtaining a license or payment of royalties.

However, the TIGER database has several severe limitations that restrict, if not prevent, its utility as a "out of the box" navigation database. Specifically, absolute positional representations of roads are quite mediocre. While freeways and other major traffic arteries are represented in the database, their database locations are strongly uncorrelated with reality. This presents a problem for use with accurate position-finding equipment such as global positioning satellite (GPS) receivers—the positional fix for a vehicle on a real road may return a nonsensical "off-road" position in the database. Additionally, the database does not accurately represent fine-scale road connectivity. Grade separations, such as for example overpasses and undercrossings, are not represented—rather, TIGER typically includes these features as nodes between the two roads. Use of a database with these features for vehicle navigation would lead to nonsensical driving directions such turning from an overcrossing onto a perpendicular road whose street level is many meters below the grade of the first road. Additionally, TIGER does not include information about one way roads, restricted turns, or road blockages such as sometimes occur near railroad crossings or in residential or other restricted traffic areas. Some fictional road features, such as fragmentary, unconnected roads or roads that are erroneously represented as intersecting are also included in TIGER.

An inexpensive, less labor intensive method for developing accurate, navigable databases or, alternatively, for improving existing navigation databases is therefore desirable.

SUMMARY OF THE INVENTION

In one embodiment of the present invention, a method for generating an improved database representing a road network is provided. The method generally comprises the following steps. A baseline road in the road network is defined, wherein the defining comprises replacing an original representation of the baseline road in the database with new data, and wherein the new data have a greater accuracy than the original representation. The new data are collected from one or more vehicles traveling a route in the road network. The route is divided into one or more route segments. Each route segment is assigned as an on-baseline segment, an off-baseline segment, an off-baseline to on-baseline transition, an on-baseline to off-baseline transition, or a within-baseline transition. The collected data a for each route segment are processed and added to the improved database.

In another embodiment, the present invention provides a method for generating an improved database representing a road network. This method generally comprises the steps of recording a plurality of vehicle position data points from one or more vehicles traveling on a baseline road such that all of the available directions of travel on the baseline road are traveled by at least one of the one or more vehicles and compiling the vehicle position data. The recorded data points are connected to form a semi-continuous trace of the geometric shape of the baseline road;. This trace is compared to a representation of the baseline road in an existing database that comprises road identities and/or properties. One or more of the identities and/or properties from the existing database are assigned to the baseline road representation in the improved database.

In another embodiment, the present invention provides a method for deducing road connectivity that comprises the step of recording a plurality of vehicle position data points from a vehicle traveling a route where the route comprises a first road segment and a second road segment. The route further comprises a junction between the first road segment and the second road segment. The vehicle position data points are discretized based on a measure of flow such that the data points are binned into categories. The semi-continuous traces for the roads are aggregated into a database that represents one or more road connections generally followed by vehicles traveling on the roads.

BRIEF DESCRIPTION OF THE DRAWINGS

Other objects and advantages of the present invention will become apparent upon reading the detailed description of the invention and the appended claims provided below, and upon reference to the drawings, in which:

BRIEF DESCRIPTION OF THE EXHIBIT

Exhibit A, which is filed herewith and incorporated herein by reference, comprises nine figures used in a presentation to potential funders of the assignee (Circumnav Networks, Inc.) on Nov. 30, 2004. The slides present a few detailed depictions of various aspects of a navigation database produced according to one embodiment of the present invention. Exhibit A is not intended to limit the scope of the present invention in any way.

Incorporation of Material Submitted on Compact Disk

In accordance with 37 C.F.R. §1.52(e)(5), the present application incorporates by reference the computer programs on the compact disk submitted herewith. Per the requirements of 37 C.F.R. §§1.77 and 1.52(e), the compact disk appendix is submitted in duplicate (each labeled in accordance with 37 C.F.R. §1.52(e)(6) and further designated "Copy 1" and "Copy 2" respectively. Also attached is a transmittal letter indicating the operating system compatibility (MS-Windows™) of the disks and containing a list of files contained on each copy. The file listing comprises file names, sizes in bytes, dates of original file creation, dates of file creation as indicated on the disk (because the files were transferred from a Linux operating system computer to MS-Windows, the file creation dates as indicated on the compact disk are all the date of the provisional application to which the instant application claims priority), and other identifying information as applicable.

The "Makefile" file which is listed first in the attached listing of files comprises assembly instructions that explain the purpose and meaning of the remaining files with sufficient detail to be understood by one of ordinary skill in the art.

Detailed Outline of Exemplary Embodiments

The following detailed descriptions of various exemplary embodiments are provided to illustrate some of the aspects and advantages of the present invention. The descriptions provided are not meant to limit the scope of the invention in any way. The full scope of the invention should be construed in light of the claims which are appended hereto.

The present invention generally provides methods for preparing a drivable navigation database using position and/or trajectory data collected from vehicles traveling within a road network. In general, the present invention provides a method for generating a drivability database representing a road network in a region. Exemplary steps of this general method are summarized in the flowchart 100 of FIG. 1. The road network represented by the baseline database may include a subset of the roads in a region. The represented roads are advantageously those that carry a large fraction of the vehicular traffic in the region. One or more criteria, examples of which are described in greater detail below, may be applied to identify the roads in the road network that are necessary to construct a self-contained, internally consistent drivability baseline database.

Figure 1:
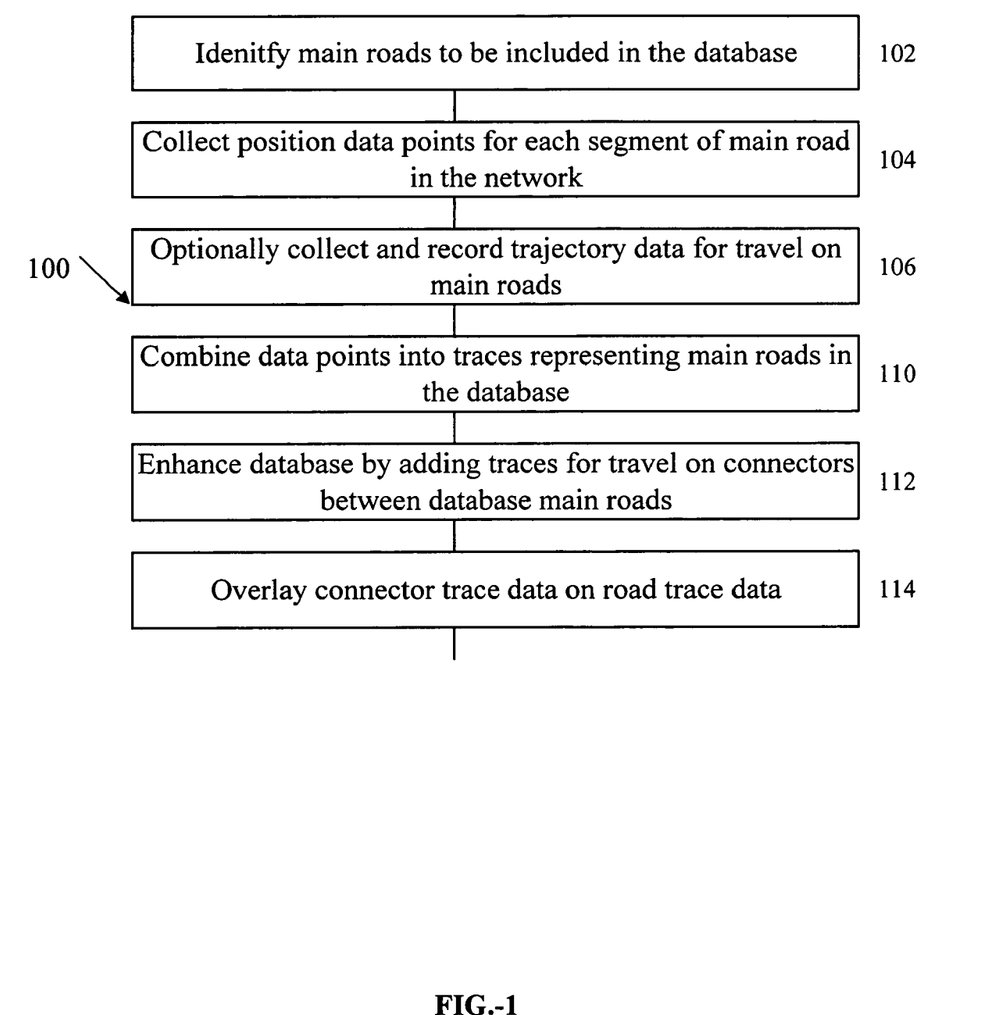
FIG.-1 is a flow chart showing exemplary steps of a general method for generating a drivability database according to one embodiment of the present invention.

Once the roads to be included in the database are identified 102, data points are collected for each segment of road in the network 104. In one embodiment, the data points are collected by driving all segments of each road in the road network with one or more vehicles equipped with a positioning device and a data recorder. The positioning system may be a GPS or any position determination method that uses periodic sampling and that yields at least latitude, longitude, time, and error estimates with sufficient accuracy. The positioning device may further provide and record heading or trajectory data 106. Appropriately equipped vehicles advantageously drive the road segments in a manner that produces positional and/or trajectory traces that define each road segment. For some roads, the vehicles may drive the functional right lane of each road segment. The functional right lane is defined as the furthest right lane in each direction that remains relatively constant over a long distance (for example, it does not periodically become an exit-only lane that is renewed by an entrance lane on the opposite side of a road junction or freeway interchange). Alternatively, data traces may be collected for a road segment by driving the second lane from the left (for multiple lanes in each direction) or even the left lane. Selection of the appropriate driving conditions to define a given roadway for the purposes of the present invention may be made by one of ordinary skill in the art using routine experimentation guided by the teachings provided herein.

The resultant traces of positional data and/or vehicle headings or trajectory are then combined as described below to form a "skeletal" representation of the "baseline" roads to be included in the database 110. The resultant skeleton of baseline roads may be further enhanced by the addition of position and/or heading data describing the connectors that link the roads in the baseline 112. For example, these connectors may include freeway junctions as well as on/off ramps between surface streets and freeways. Each such set of connectors for each freeway or comparable restricted access roadway in the data base is driven in all available directions. Position and/or heading trace data for the connectors are overlaid on and combined with trace data for the baseline roads to produce a drivable road network database 114.

A further embodiment of the present invention provides a method for deducing road connectivity—where and how roads connect, such as for example at intersections, freeway on and off ramps, etc.—and how vehicles traveling on the roads move between different road segments. The method comprises the steps of aggregating one or more GPS traces from vehicles traveling on the various roads and connections in a road network. The resultant data traces may be used to map off baseline roads for addition to the database or, alternatively, to improve the representation of roads in an existing database.

The present invention also provides a method of assigning street names and other descriptive properties to elements of a geometric shape and connectivity database using a conventional map database as a reference source for those descriptive properties. Missing and spurious minor connections and/or newly constructed road segments may be identified and incorporated into the database by analyzing the driving and route following behaviors vehicles navigating within the road network. Exemplary steps for this method are summarized in the flow chart.

Route guidance algorithms may be applied to avoid potentially problematic navigation instructions. For example, an individual road in the road network may be assigned a higher "impedance" value (i.e. a slower speed rating, higher resistance to traffic flow, etc.) where actual connectivity of the road segment to other roads in the road network is not certain. This condition may occur where a preexisting, but unverified database, such as for example the TIGER database, is used to provide road names, street addresses, rudimentary road connectivity, etc. Connections in the database that meet one or more pre-set criteria for being suspect may be tagged with higher impedance ratings than connections with higher confidence. In this manner, navigation instructions based on the database may include fewer erroneous and/or physically impossible driving directions. As vehicles provide feedback data to the road network database, the impedance values assigned to individual connections may increase or decrease in response to evidence reflecting the real world drivability of these connections.

1. Method for Generating a Baseline Database Representing a Road Network

In one embodiment of the present invention, a method is provided for generating baseline databases representing a network of one of more roads. As a first step, the existence and identity of specific roads to be included in a navigable "baseline" database are asserted. A navigable baseline database is one that is internally consistent. Each segment of the represented road network may be reached by traveling upon another segment or segments of the road network (no disconnected segments). The baseline road network by definition does not reach every possible destination in a region. To reach a specific local destination, such as for example a residence in a housing tract, a vehicle would travel on the baseline road network to a point as close as possible to the destination and then leave the baseline road network to travel "off-baseline" for the final portion of the trip. Likewise, traveling from an off-baseline starting point requires that the vehicle navigate non-baseline roads to reach an entry point to the baseline network.

There are a number of possible criteria for selecting the roads that make up the baseline road network. For example, it may be advantageous to identify those roads in a region that give the most "bang for the buck." Some possible, non-limiting examples include roads that carry some high fraction of the total vehicular traffic in a region. This may be based on one or more measures of "traffic" such as for example average vehicle miles traveled, vehicle trips, and the like, and roads and destinations served by the roads that are most likely to be frequented by users of the database (i.e. customers and/or navigation information). According to one embodiment of the present invention, a threshold criterion or criteria are determined based on the returned value per effort of collecting data for the baseline roads. Some possible examples for such criteria include but are not limited to all roads in a region that are part of the interstate highway/state "freeway" system, roads accounting for more than some percentage (i.e. 75%, 85%, 90%, etc.) of the vehicle miles traveled in a region, and/or human selection of specific roads based on inspection of a map and/or knowledge of traffic patterns in a region.

Figure 2:
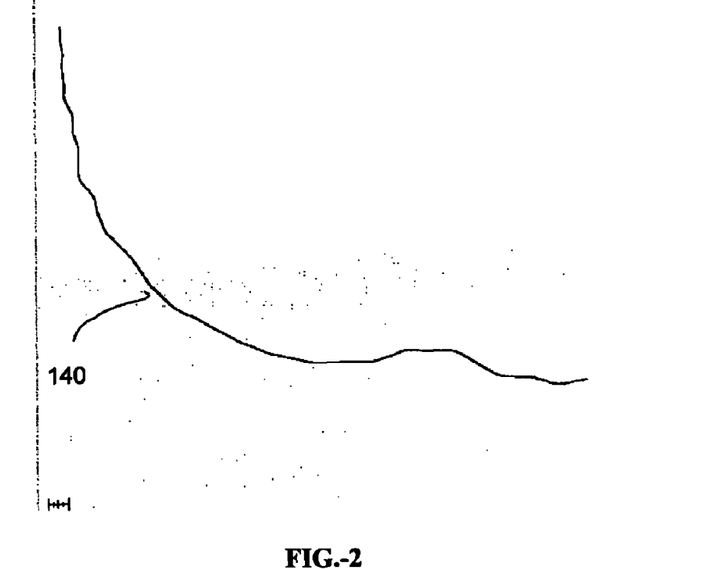
FIG.-2 is a diagram showing an example of unprocessed trace data collected according to one embodiment of the present invention for California State Route 85 in the California county of Santa Clara.
Figure 3:
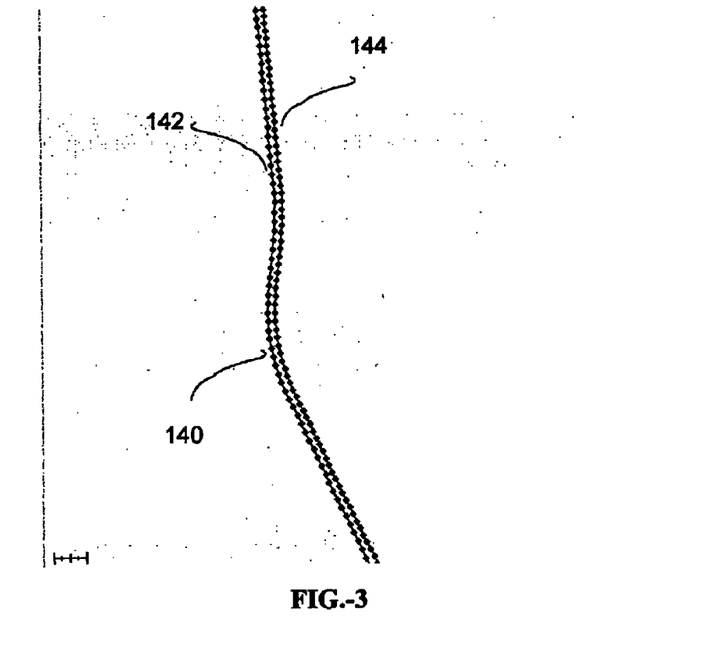
FIG.-3 is a diagram showing a subset of the unprocessed trace data shown in FIG.-2 at a closer resolution such that the northbound and southbound functional right lane data traces of CA Route 85 are distinguishable. Individual data points are indicated by the diamond symbols.

According to this embodiment, positional and/or trajectory data are collected along each segment of road in the baseline road network. Trace data are advantageously collected for travel in both directions along each segment. These trace data may be collected by driving a defined lane in each direction on each road segment in the network. In one embodiment, the functional right lane (the right most lane in which a vehicle can travel consistently without exiting the road) may be used for restricted access roads such as for example freeways. For example, on a typical American freeway, the functional right lane may be the actual right lane except near freeway on- and off-ramps or interchanges with other freeways. In these areas, "exit only" lanes may occur to the right of the functional right lane, and traffic entering the freeway may be routed into acceleration lanes to the right of the functional right lane. For surface streets that are included in the baseline road network, roads may be best defined using the lane that is second from the left. For roads with only a single lane in each direction that lane is used. Trace data may be collected by traveling the roads in vehicles equipped with global positioning system devices or other comparable systems capable of accurately determining and recording position and trajectory data for a moving vehicle. An example of trace data for California State Route 85 in Santa Clara County in California is shown in FIG.-2. The scale of FIG.-2 is such that the functional right lanes in each direction are not distinguishable in the representation of Route 85 140. FIG.-3 shows a subset of the data shown in FIG.-2 near the city of Mountain View, Calif. at a closer resolution so the functional right lane trace data for each of the southbound 142 and northbound 144 directions of traffic flow on Route 85 140 may be distinguished.

In one embodiment, position and/or heading trace data are collected by traveling the entire baseline road network with test vehicles equipped with GPS receivers and data recorders. Coverage of the entire baseline road network is not feasible (or even possible) in a single vehicle trip. As such, trace data from multiple, occasionally overlapping vehicle trips are combined to form a continuous database representation of each road in the baseline network. In collecting trace data, a vehicle may drive the defined lane of a road for some distance in one direction, then exit the road to reverse direction before returning to the starting point. The trace data from this loop are examined by an algorithm to identify data points corresponding to the "turn-around" portion of the trip as well as those data points corresponding to maneuvering necessary to reach the starting point on the road via other, possibly non-baseline roads. Alternatively, a vehicle may reach a segment of road on which it will drive a two-way loop at a location other than near the starting point of the loop. In other words, the "loop" driven by the probe vehicle may include driving in, for example, the southbound direction to a first turnaround point, the northbound direction past the starting point to a second turnaround point, and then the southbound direction again to return to the starting point. The trace data from such a loop are examined to discard the two turnaround sections and to patch the two southbound segments into a single southbound trace between the first and second turnaround points.

Figure 4:
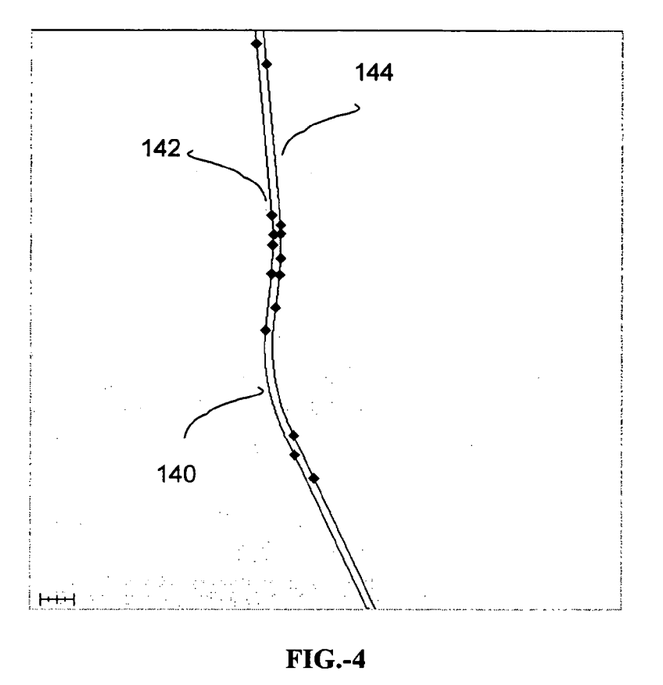
FIG.-4 is a diagram showing the database representation of the trace data subset of FIG.-3 with nodes between individual fitted segments indicated by the diamond symbols. The data are fitted according to one embodiment of the present invention.
Figure 5:
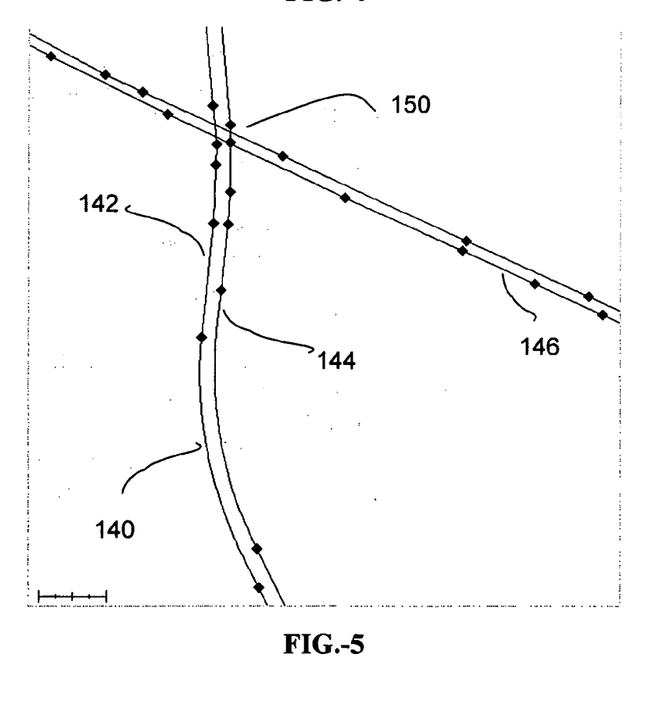
FIG.-5 is a diagram showing a fitted representation for an example section of a baseline road network for the San Francisco Bay Area that includes the junction of California State Route 85 and El Camino Real (CA Route 82) in Mountain View, Calif.

The trace data from multiple drives are combined to produce a raw data representation of the road network comprising only short (point to adjacent point) straight line segments. This may be accomplished by conducting a piecewise fit of the raw data representation. In one embodiment, this may be accomplished by dividing the raw data representation into straight sections and "simple" curved sections. FIG.-4 shows an example of the results of this method as applied to the raw trace data of FIG.-3. FIG.-5 shows another example of fitted defined lane trace data for CA Route 85 140 and El Camino Real 146 near their junction in Mountain View, Calif. In one embodiment, for straight sections the method may identify a continuous sequence of points in the raw data representation that are adequately fitted by a straight line. Straight line segments may be identified using straightness of the position data fixes as well as trajectory or "compass heading" heading data. Heading data are generally provided by a GPS receiver in motion. As the straight line is extended to additional points, the displacement of the line from the data points is monitored. When displacement becomes significant, for example if it exceeds some threshold for determining adequate fit, the line segment is shortened to the last data point lying within the tolerance of the straight line fit. Note that that although the two roads 140 142 depicted in FIG.-5 cross each other, there are no nodes at the crossing points of the lane representations 150. This is because there are no direct, drivable connections between these roads at the crossing point.

Starting points of curved sections may be identified in a similar manner. The method may look for divergence of the straight line fit from the raw data representation as well as a change in the compass heading for the vehicle. Thresholds or tolerances may be adjusted as necessary to fine tune the fit. In general, curved segments may be simple or more complex. Simple curves are "one handed" (having a second derivative that does not change signs through the curve). These may be further defined as having a limited amount of angular turn through the curve. Simple curves may advantageously be defined as having less than about 120 degrees of curvature. More complex curves (i.e. "S" shaped curves or curves with greater than about 120 degrees of curvature) are represented as a sequence of "simple" curves. According to one possible embodiment, simple curves may be represented with a mathematical curve formula, such as for example, a b-spline, a polynomial, an arc of a circle, a Bezier such as a cubic Bezier, or the like. A cubic Bezier may be stored in a database as a total of 4 points: two end points plus two control points. Since the end points are already stored in the database as the end points of the segment, representation of curved segments in this manner may yield a substantial savings in database storage requirements relative to the raw data representation.

The curve formula may be fitted to the trace data for curved road segments. For example, this may be accomplished by minimizing the differential between the raw data representation and the mathematical curve representation for the segment. Alternatively, the displaced area between the representative curve and line segments connecting the data points may be integrated. Next, the fit is iterated. A complex curve that is not readily fit by a single Bezier or other mathematical function may be iteratively segmented into two or more smaller curve segments that are better represented by the function of choice. This may occur when a gently curving road segment follows a more sharply curved segment with the same direction of curvature, or visa versa. It may be advantageous in such a situation to break the curve into smaller segments at or near the point of increased inflection. In general, curves of greater than 120° total curvature are not well-represented by a cubic Bezier curve. As such, these curves may be segmented into smaller curved segments, each of which is represented by a Bezier function. Bezier curves allow the tangent to be set at each end of the curve. Continuity of the baseline representation fit may be improved by requiring that the first derivative of adjacent, joined segments be identical. In other words, where a curved section joins a straight line segment, the tangent of the Bezier representation is set parallel to the straight line segment.

In one example, this segmenting may be accomplished by fitting a Bezier curve to the first approximately 90° of curvature and then repeating the process with the remaining curve until the entire curve is represented. One of skill in the art will readily understand that alternate criteria may be used to break high curvature road segments into more readily "fittable" pieces. in an alternative example, a Douglas-Peuker algorithm may used for curve fitting. A chord is drawn between the beginning and end of a curved section of the raw data representation. The curved section is subdivided at the point where the raw data representation has the maximum displacement from the mathematical curve representation and the curve fitting procedure is repeated for both new segments. This may be performed iteratively as needed. The fitted data representation of CA Route 85 alone in FIG.-4 and of the junction of CA Route 85 140 with El Camino Real 146 shown in FIG.-5 illustrate the advantages of the fitted data representation. By comparison with FIG.-3, FIG.-4 represents the shape of CA Route 85 140 equivalently with substantially fewer control points and thus substantially reduced data storage and manipulation requirements.

Figure 7:
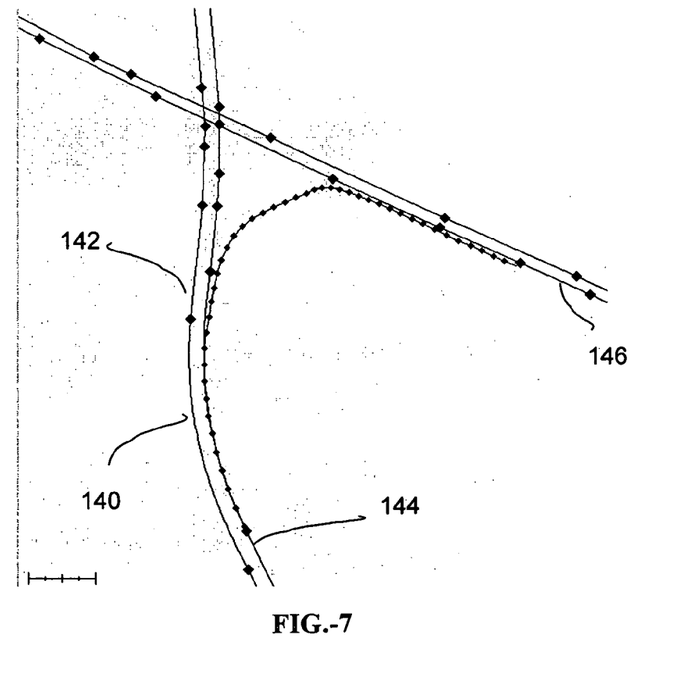
FIG.-7 is a diagram showing trace data for the connector from northbound CA Route 85 to eastbound El Camino Real superimposed on the fitted representation shown in FIG.-5.
Figure 8:
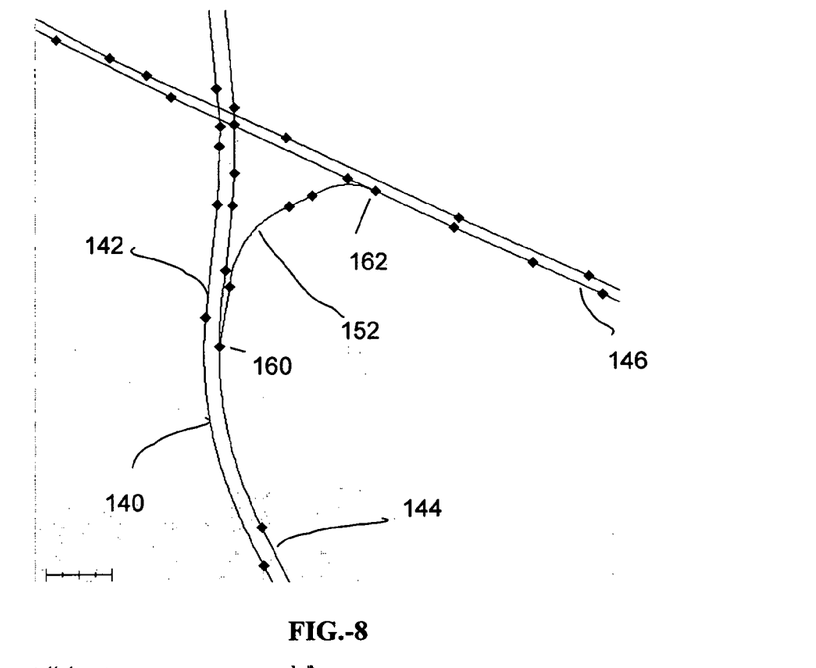
FIG.-8 is a diagram showing a fitted data representation for the connector from northbound CA Route 85 to eastbound El Camino Real joined to the fitted representation shown in FIG.-5 though connection points G1 and G2.

An exemplary result of a line fitting routine according to one embodiment of the present invention is illustrated in FIG.-7 and FIG.-8. The fine sequence of GPS data points that represent the travel path of the exit ramp 152 in FIG.-7 have been replaced in the representation of the exit ramp 152 in FIG.-8 by a straight line segment followed by a Bezier curve which is followed by another straight section and a second Bezier curve. Replacing fine sequences of GPS data points with a mathematical representation may be accomplished by dividing a trace connecting the individual data points into sub-sections characterized by consistent heading changes vs. distance traveled along the road.

Figure 6:
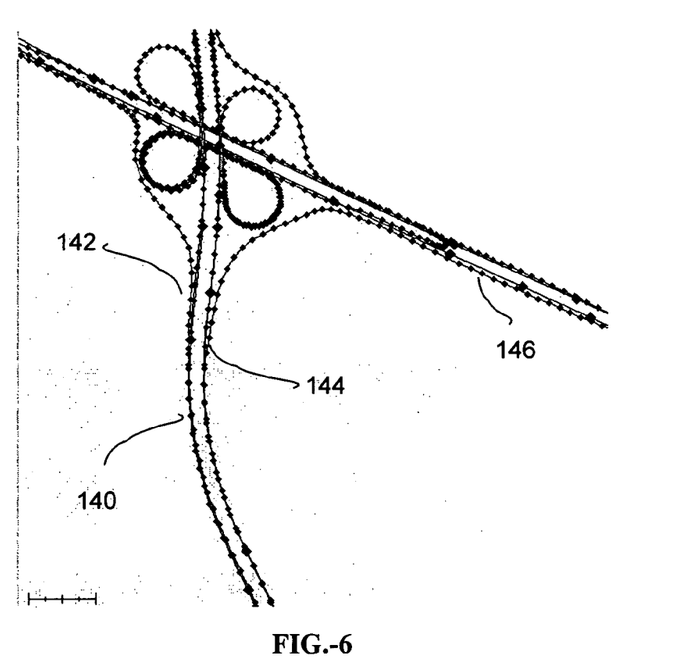
FIG.-6 is a diagram showing trace data collected for the ramps connecting CA Route 85 and El Camino Real superimposed on the fitted representation shown in FIG.-5. Larger diamonds indicate nodes in the fitted main road representation and smaller diamonds indicate individual position data points in the connector trace data set.

Positional and/or trajectory data may be collected for connector road segments that connect the main arteries of the baseline. An example of the connections to be driven for each crossing of roads in the baseline road network is illustrated in FIG.-6. Note that in FIG.-6, the connector trace data for the junction shown in FIG.-5 have been superimposed on the fitted representation of CA Route 85 140 and El Camino Real 146) near their junction. FIG.-7 isolates the trace data for the ramp from northbound CA Route 85 to eastbound El Camino Real, and FIG.-8 shows a fitted representation of this ramp according to one embodiment of the present invention. Note that connector ramp 152 has been topologically joined to the baseline road elements to which it connects, specifically to north-bound Route 85 140 at an exit connector point 160 and to eastbound El Camino Real at an entry connector point 162. For each crossing of roads in the baseline road network, position and heading trace data are collected for the interconnections between each direction on each road. For example, if north-south freeway A crosses east-west freeway B, data are collected for the following connectors (if they exist). Northbound A to eastbound B, Northbound A to westbound B, Southbound A to eastbound B, Southbound A to westbound B, Eastbound B to northbound A, Eastbound B to southbound A, Westbound B to northbound A, Westbound B to southbound A.

Figure 9:
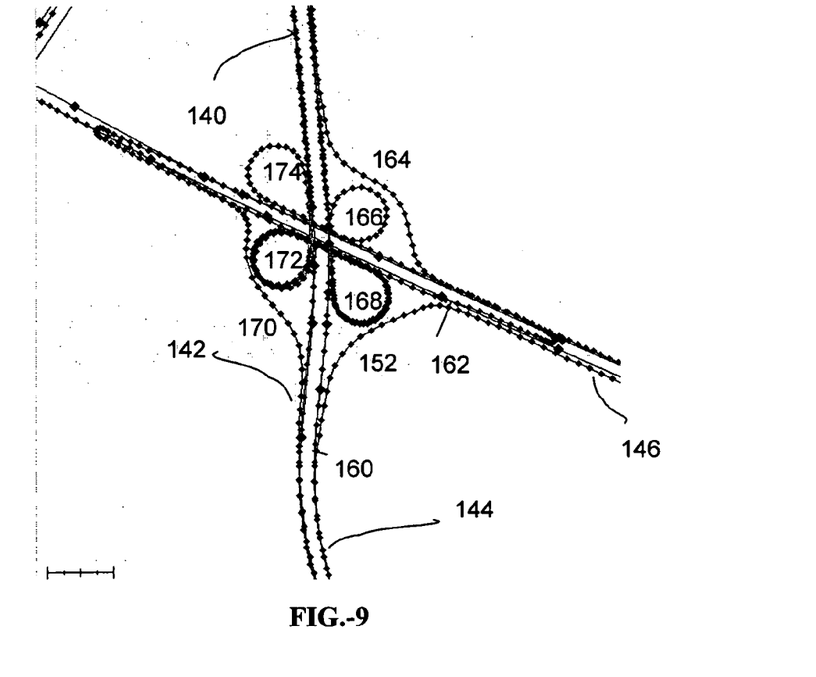
FIG.-9 is a diagram showing a full view of the junction of CA Route 85 and El Camino Real shown in FIG.-5 including the fitted representation for CA Route 85 and El Camino Real and trace data for all of the connector ramps in the junction.

For crossings of restricted access roads with surface streets that are represented in the baseline road network database, a similar procedure is conducted. On-ramps to both directions of the restricted access road are driven from each direction of travel on the surface street, and off-ramps accessing both directions of travel on the surface street are driven from each direction of the restricted access road. For the example shown in FIG.-9, starting at CA Route 85 north of the junction and working clockwise, the ramps driven include westbound El Camino Real to northbound CA Route 85 (164), northbound CA Route 85 to westbound El Camino Real (166), eastbound El Camino Real to northbound CA Route 85 (168), northbound CA Route 85 to eastbound El Camino Real (152), eastbound El Camino Real to southbound CA Route 85 (170), southbound CA Route 85 to eastbound El Camino Real (172), and westbound El Camino Real to southbound CA Route 85 (174).

Trace data for the connectors in each interchange are then joined to the fitted representation of the baseline roads. The connector data are compared to the "on-baseline" data collected by driving the baseline roads. Sample data for a connector is shown in Table 1. Divergence and/or convergence in the steps below may be estimated by one or more of positional fixes and heading/trajectory data at each point. In Table 1, the phrase "consistently matches" indicates a sequence of fixes matched to a roadway, where: 1) the distance between each fix and the roadway is small (how small depends on road type and side of road); 2) the distance between each fix and the roadway is similar (+/−one meter); and 3) the difference in heading between the fix and the path of the roadway is small (<2 degrees). Locations at which the connector data diverge from the main road fitted representation after closely following the defined lane fitted representation are identified. Divergence that is followed by complete separation of the connector data from the baseline road may indicate the beginning of an off-ramp. Complete separation followed by converge to data for a baseline road may indicate an on-ramp.

Figure 10:
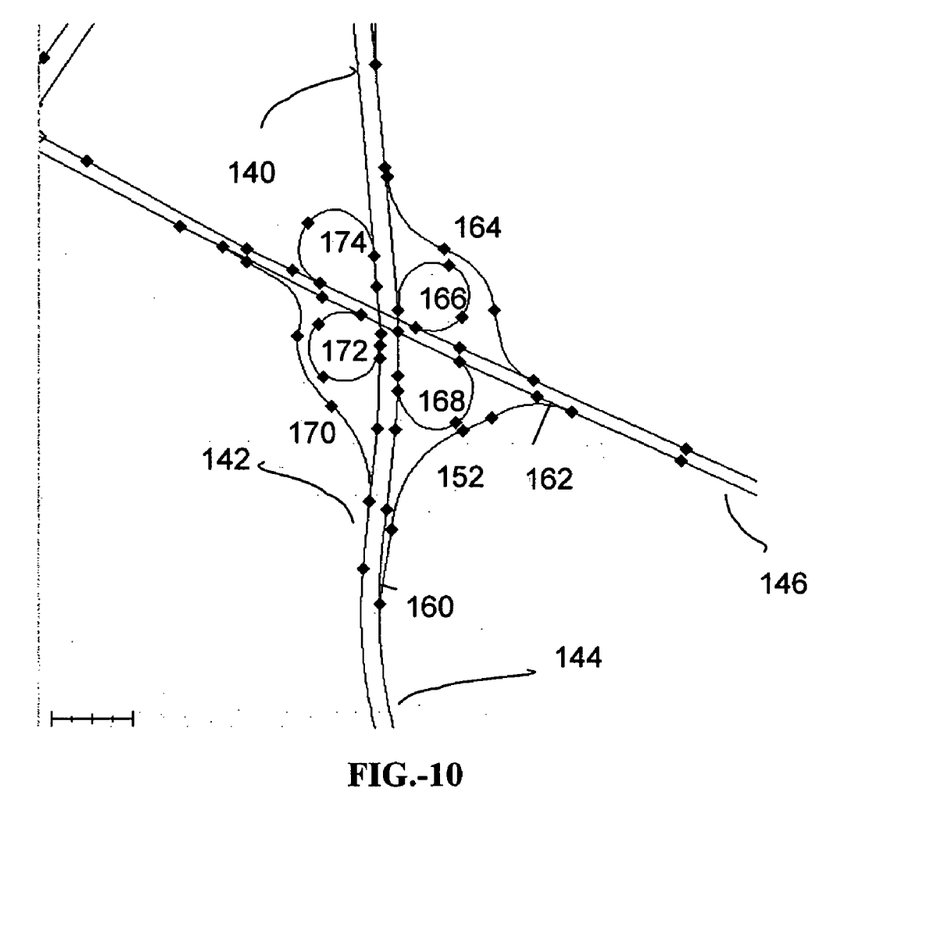
FIG.-10 is a diagram showing a full view of the junction of CA Route 85 and El Camino Real shown in FIG.-5 including the fitted representation for CA Route 85 and El Camino Real and fitted representation for all of the connector ramps in the junction.

The point of convergence or divergence from the defined lane of the baseline road is identified for each on-ramp or off-ramp. This may be accomplished by backing up along the baseline road representation to a point before the divergence or convergence occurs and assigning a "node" at the point where the connector trace data and baseline road fitted representation for position and/or heading are indistinguishable within some pre-set threshold. Once the start and end points of each connector segment are fixed, the connector segment may then be processed in the same manner as the baseline roads. For example, straight line segments are replaced by straight lines, curved segments are replaced by mathematical curve representations such as cubic Bezier curves and the like as discussed above. A fitted representation of the connector ramps for the junction of CA Route 85 140 and El Camino Real 146 is shown in FIG.-10.

A further issue with inter-baseline connectors arises in locations where a single exit from a baseline road may subsequently branch into two or more ramps that lead to alternative directions, other roads in the baseline road network, or other roads not in the baseline network. Additionally, all position and heading data are inherently imprecise to some degree. Exit and entry ramps to restricted access roads such as freeways may parallel the freeway for some distance before diverging from or converging to, respectively, the restricted access road. Special care and educated adjustments to the data fitting tolerances may be required to prevent the parallel lane from being erroneously combined with the defined lane of the restricted road, or alternatively, to prevent the defined lane from being represented in the fitted database as displaced from its proper location. The second problem may be addressed by asserting that the trace data used to define the baseline roads has a higher accuracy or assigned weight than the trace data for the connector ramps.

The various connector segments in the database are assigned names based on their connectivity. For example: "right exit from southbound Highway 85 to westbound El Camino Real," "right exit from southbound Interstate 880 to westbound Highway 84," etc. Next the resultant database representation may be reexamined to perform a "clean-up." This may comprise determining whether the piecewise fitting of the raw data representation has introduced meaningless segments, such as for example: small segments that might be best "absorbed" by adjacent segments. This may also comprise performing a "noise" check to examine road representations and identify geometrical oddities that are inconsistent with assumptions for "real" roads. These anomalies may be "smoothed" using an algorithm or alternatively tagged for examination by a human operator.

2. Method for Incorporating a Navigable Baseline Database with an Existing Road Database In this embodiment, the present invention provides a method for combining two databases into a single navigable, drivable database. As background, a discipline of cartography is conflation, which means the act of blowing together or intermingling without destroying. Conflation generally comprises taking two databases and making them into one, while selecting the "best" properties of each. In practice, this is quite difficult. In the present invention, one or more of general methods may be applied. In one example, the descriptive properties from database A ($DB_A$) may be copied to the equivalent elements in database B ($DB_B$). If $DB_A$ includes a better representation of one aspect of the navigable road network (such as for example geometric features like intersections) while $DB_B$ includes a better representation of some other aspect (such as for example descriptive information like names and addresses), the geometric properties may be transferred from $DB_A$ to the corresponding elements in $DB_B$. In a further embodiment, additional elements may be added by importing data about "new" aspects of $DB_A$, such as for example certain streets, to $DB_B$ where $DB_B$ has no data about the new aspect. In another embodiment, descriptive information may be transferred from elements in $DB_B$ onto equivalent elements in $DB_A$.

According to one embodiment of the present invention, a baseline road database ($DB_A$) such as for example one derived as described above, is combined with a database ($DB_B$) comprising a representation of all or most roads in the region covered by the $DB_A$. This method generally comprises the following steps. The common elements, such as for example road segments that are represented in both $DB_A$ and $DB_B$, are identified. In this embodiment, the common elements may be the baseline roads, the connectors between baseline roads, and the on/off ramps connecting baseline roads to off-baseline roads. For each element in $DB_A$, the equivalent in $DB_B$ is found if it exists. The subset of roads in $DB_B$ that includes all elements of $DB_B$ that are represented in $DB_A$ is identified This subset is denoted as $DB_{B\sim A}$, to refer to the portion of $DB_B$ that is similar to $DB_A$.

The mapping between $DB_A$ and $DB_B$ is seldom clean or deterministic—for a given element and its neighborhood in $DB_A$, it is often necessary to look for the "equivalent" in the same neighborhood in $DB_B$. Algebraic topology is the mathematical field that defines formal rules for determining neighborhood. In one embodiment, the baseline ($DB_A$) database is asserted to be complete and self-contained, and the elements of $DB_A$ that were used to identify $DB_{B\sim A}$ are asserted to be more correct than their counterparts in $DB_{B\neq A}$. $DB_{B\sim A}$ is deleted from $DB_B$ to yield a database containing elements $DB_{B-(B\sim A)}$. The shape of elements in $DB_{B\sim A}$ are forced to be congruent to the equivalent elements in $DB_A$. This means that after this procedure the general approximate shape of the $DB_{B\sim A}$ elements within $DB_B$ is similar to the corresponding elements within $DB_A$ so that subtraction of the $DB_{B\sim A}$ elements from $DB_B$ leaves a gap that is approximately equivalent to the shape of the elements in $DB_A$. Other elements in $DB_B$ that are adjacent the elements of $DB_{B\sim A}$ are simultaneously reshaped. This process may be envisioned as a stretching and/or compressing exercise in which the elements of $DB_B$ are modified to maintain their own internal continuity while also conforming to the shape of the baseline $DB_A$. A mathematical tool called a "rubber sheet transformation" may be used to perform this step, where the position changes that were used to reshape $DB_{B\infty A}$ are also used to define the control points that define the localized stretch of the rubber sheet.

All of the elements in $DB_{B\sim A}$ forming the new database $DB_{B-(B\sim A)}$ are then removed from the reshaped $DB_B$. Note that $DB_{B-(B\sim A)}$ contains space for adding the elements of $DB_A$, and that the intersection between $DB_A$ and $DB_{B-(B\sim A)}$ is mostly empty. $DB_{B-(B\sim A)}$ is further modified to give $DB'_B$ which includes connection points to allow the unfinished $DB_A$ ramp connectors to attach to the targeted road segments in $DB_{B-(B\sim A)}$. $DB_A$ is modified to produce $DB'_A$ where the endpoints of the unfinished ramp connections are moved to line up with the connection points identified above. Replacement relationships for inserting $DB'_A$ elements into the spaces provided in $DB'_B$ are identified. For every former relationship between elements in $DB_{B\sim A}$ and $DB_{B-B\sim A}$, the equivalent relationship is constructed between elements in $DB'_A$ and $DB'_B$. This applies specifically to any elements in $DB'_A$ that are known to be surface street features. This does not apply to elements in $DB'_A$ that are known to be freeways or ramps.

Figure 12A:
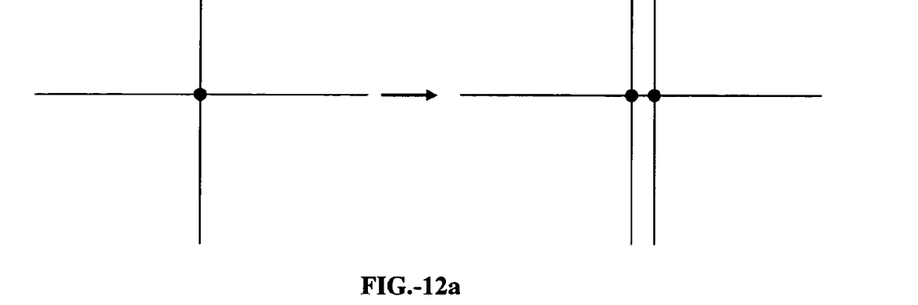
FIG.-12a, FIG.-12b, and FIG.-12c show the changes in geometry of two example intersections when the representation of the north-south road through the intersection is changed from a centerline only representation to a bi-directional representation.
Figure 12B:
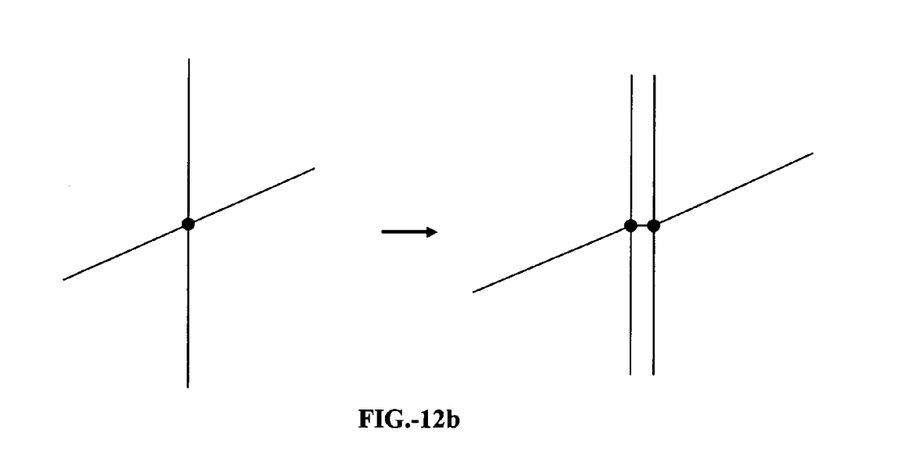
Figure 12C:
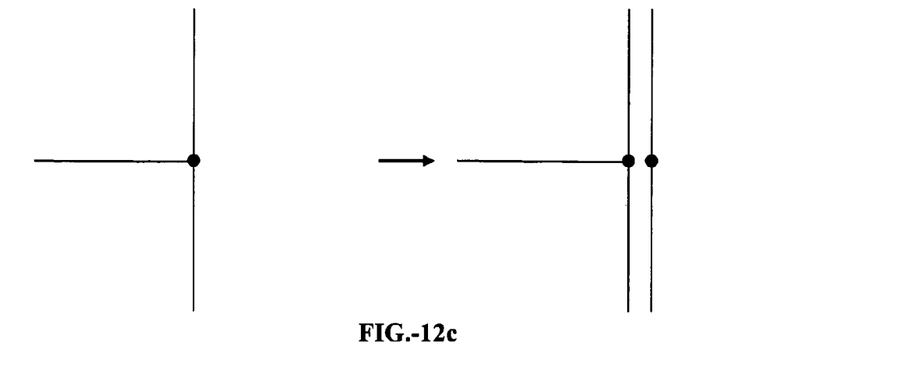

If a road in $DB_{B\sim A}$ and a second road in $DB_{B-B\sim A}$ formed a crossing intersection, an equivalent crossing intersection is constructed between the corresponding elements in $DB'_A$ and $DB'_B$. FIG.-12a and FIG.-12b show before and after examples of this type of construction. If a road in $DB_{B\sim A}$ and a second road in $DB_{B-B\sim A}$ formed a tee intersection, then an equivalent tee intersection is constructed between the corresponding elements in $DB'_A$ and $DB'_B$. FIG.-12c shows a before and after example of this type construction.

For the specific example where the TIGER database is $DB_B$, several assumptions may be used. First, all lines are centerlines. $DB_B$ does not include information regarding direction of traffic flow on the represented roads, and all intersections are simple intersections. For example, interchange ramps are not depicted, nor are separated turn lanes and/or underpasses and over crossings.

Using a method according to this embodiment, it is possible to exhaustively construct a set of replacement rules based on having, for every intersection and combination of a baseline road, a picture of what the new intersection should look like and/or a corresponding set of geometric instructions comprising rules or instructions for constructing the new intersection. For example, the "straightness" of roads is generally maintained. In other words, as elements of the {B}-{BA} representation are translated, expanded, or compressed, operations that would tend to "kink" or bend roads are avoided. Additionally, modifications to the elements of {B'} diminish in magnitude as distance from the perturbation (for example a difference between an {A'} element and the {BA} element it has replaced. A further issue arises for "centerline" only databases such as TIGER. Representations of intersections may become skewed by replacing the centerline road representation with a dual-direction defined lane representation. In the dual direction representation, the road has finite width. While this may not present a significant problem for intersections of two roads at close to a 90 degree angle (see FIG.-12a), intersections of substantially non-perpendicular roads may become physically unrealistic as shown in FIG.-12b. In the example of FIG.-12b, when the representation of the north-south road is changed from centerline-only to a bi-directional, defined lane representation, it may be advantageous to specify that replacement of an intersection preserves angles of the intersecting roads as much as possible. For example, in the intersection shown in FIG.-12b, the road crossing the north-south road may be modified slightly to maintain the linearity of the road (i.e. the eliminate north-south displacement may be eliminated either by slightly changing the slope of the two road segments or by translating one or both of the road segments along the north-south axis such that they are colinear. This issue becomes more pronounced for crossings of two roads that are represented as bi-directional with defined lanes in each direction. In such a case for roads that cross at an angle substantially different than perpendicular, a sizable displacement or realignment may be required to maintain the colinearity of the roads.

For intersections where more than two roads meet, further smoothing may be necessary. For example, one method may be to maintain as closely as possible the positions of the roads that cross at approximate right angles while slightly displacing or realigning the roads that cross at steeper angles. One or ordinary skill in the art could readily understand based on this disclosure how to create a set of rules that would properly govern the possible eventualities arising in a database representation of real road geometry.

In applying the modifications to the connective elements and their surroundings in database {B'} such that {B'} meshes and combines properly with elements of {A'}, all of the required element changes are advantageously approximated at a "first cut" level. Then, the combined affect of all such modifications are applied in concert, much like solving a large set of algebraic equations simultaneously. The end effect is one of placing a map based on the elements of {B'} on a "rubber sheet" and then pulling and pushing as necessary so that the connective elements of {B'} mate up properly with the corresponding elements of {A'}. In doing this, each such stretching or compressing operation has a local "neighborhood" beyond which it has no further effect. In effect, the local modifications propagate with diminishing effect as distance from the affected connector increases. Proper operations are chosen such that local modifications don't propagate endlessly. Rather, these modifications are damped out with distance.

Figure 11A:
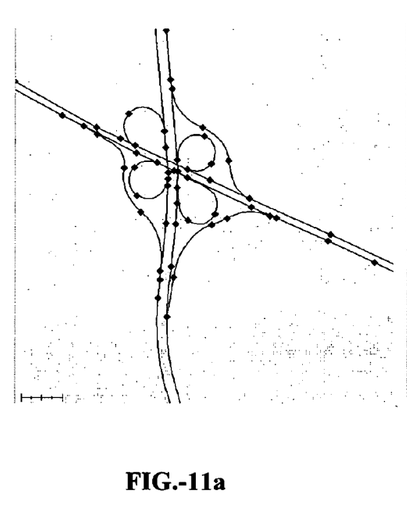
FIG.-11a, FIG.-11b, and FIG.-11c are a series of diagrams showing an example of the superimposition of a segment of road from a baseline database onto a road network represented in the TIGER database in Mountain View, Calif.
Figure 11B:
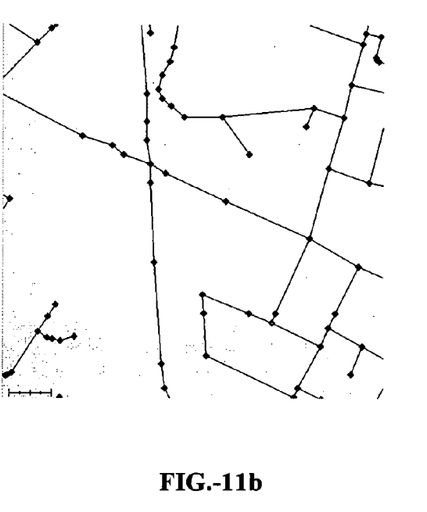
Figure 11C:
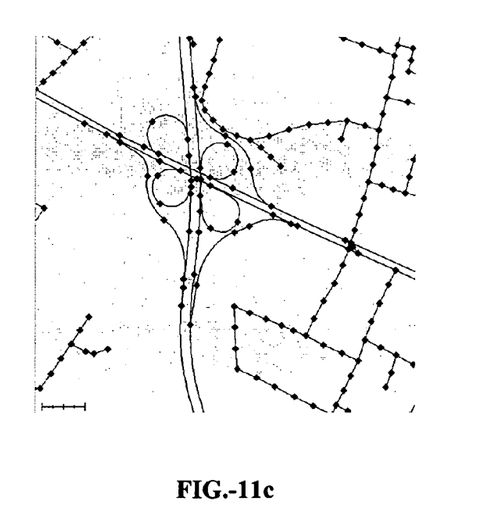

FIG.-11 shows the result of adding a segment of baseline road, in this example CA Route 85 in Mountain View, Calif., to a road representation based on the TIGER database. In FIG.-11a, the TIGER representation of CA Route 85 and its surrounding roads is shown (this is {B}). In FIG.-11b, the same region is shown with CA Route 85 removed ({B}-{BA}). FIG.-11c shows the addition of the baseline ($DB_A$) representation of CA Route 85.

In a further embodiment of the present invention, $DB_A$ is periodically compared to $DB_B$. In the limit that $DB_A$ includes all of the geometric elements of $DB_B$, only additional information is transferred between the databases. Geometric data is obtained solely from $DB_A$.

3. Method for Improving a Road Database Using Data from Probe Vehicles Traveling Throughout the Represented Road Network A further embodiment of the present invention provides a method for automated correction of a road/navigation database based on blind probe data traces collected by one or more probe vehicles traveling in an uncontrolled manner throughout the road network. In general, challenges may arise in determining how to match trace data from probe vehicles with the proper corresponding road or roads that are represented in a database. A database representation of a road or group of roads generally may include errors in either spatial dimension (X or Y, N or S, etc.). In addition, the errors are not generally consistent translations. There is also distortion of the relationship between database elements. As a probe vehicle travels along a road represented in the database, the data trace it produces is generally useful only for resolving the error in the database representation of the road in the component perpendicular to the road. Little may be learned about the parallel component of the error associated with a road position merely based on a data trace from a probe vehicle traveling on that road. Information regarding corrections to intersection locations may be resolved at intersections where a probe vehicle makes a turn.

A method according to this embodiment of the present invention may include one or more of the following steps. Trace data are collected from a plurality of probe vehicles traveling throughout a road network that is represented by a navigation or drivability database. The data traces are then binned. In one example, traces that follow a given road after turning onto that road are identified. Turns establish the beginnings of data trace segments that may be used to make corrections. For example, a trace involving a sequence of a direction change (turn of the probe vehicle) followed by consistent tracking of the database representation of a road is analyzed. Data after the turn may be matched to the road to provide information about proposed corrections to the lateral position of the road in the database. The data trace involving the turn itself may provide information about the location of an intersection, merge or divergence point, etc. (a node). In this example, travel of a probe vehicle through a node (intersection, merge point, etc.) provides information about the road position in the dimension perpendicular to the road. Turns provide further information about where the nodes are in the dimension parallel to the road.

Proposed movements are assigned to the corresponding database elements based on information derived from the set of trace data collected as described above. Multiple traces may be analyzed piecewise to form an aggregate set of proposed movements to roads in and nodes in the database representation. The proposed movements may be applied to roads in the database representation, using a "rubber sheet" type algorithm such as for example the one described above to propagate the required movements and yield a consistent, smoothed road network representation. This process may involve checking, for each node, whether the proposed movements of the node are consistent with those of neighboring nodes. Additionally, motion applied to a node should be compatible with the motion to be applied to roads leading to/from the node. For example, translation of a node in a direction parallel to a road is compatible with the road representation. However, translation of a node perpendicularly to a road is not compatible unless the road undergoes a similar motion. Connectivity and physical reality are advantageously maintained. The end nodes for a segment of road (edge of an element) may be moved in response to probe trace data. Probe data for traces following the edge (road segment) are examined to verify that the movement of the edge remains compatible with the observed data. This process is repeated iteratively to arrive at a best fit solution.

The resultant database may be double checked and folds and kinks in roads may be identifies and eliminated, if they occur. Tolerances that may advantageously be adjusted in achieving the database corrections include degree of rigidity and the amount of propagation allowed. The degree of rigidity indicates the level of "trust" of the existing database. If the present method is applied to a somewhat suspect database such a TIGER, the database rigidity may be initially set very low—corrections provided by trace data are assigned a higher degree of trust than the existing database road structure. As the database becomes improved by input from multiple vehicle traces, this rigidity factor may be increased to guard against drastic errors that could be introduced by a erroneous probe data (such as from a malfunctioning GPS unit, etc.). The amount of propagation allowed affects the distance over which a node or edge movement is allowed to affect nearby roads—how much the "rubber sheet" is allowed to be stretched or compressed over distance from the perturbation.

For curved roads, artificial nodes may be temporarily introduced to allow interim Bezier fits to new data. Upon application of an all of the data available in a given database update, the interim fits may replace the original representation. Some nodes may not be driven at all in the set of available data traces or may have only transitory data (probe vehicle travel only in a straight line in one direction through the node). If the node has no data, it moves only in response to movements by other nearby nodes. This may be accomplished by averaging the movements of all neighboring nodes. For transitory data only nodes, movement may be estimated as an average of adjacent nodes in the direction parallel to the available trace data. Perpendicular movement may be influenced by the available trace data. Care should be exercised regarding data for bi-directional roads and their intersections.

Additional issues may arise for roads that are represented bidirectionally in the database. In one example, it may be necessary to distinguish between centerline-only and bi-directional representations. As an example, a method of the present invention might use as a differentiation criterion the linear dimension between travel directions. In other words, when the distance between traces traveling in opposite directions on a road exceeds a pre-established threshold, the centerline representation may be fissioned into two directional traces. A centerline-only representation may suffice for a narrower, less heavily traveled road, such as for example, a road with up to two lanes per direction and no median. For multiple lanes per directions and/or a substantially sized median, it may be advantageous to divide the database representation into two directions of travel. Fissioning may be limited such that it occurs over some minimum continuous length of a road. This avoids intermittent fissioning and re-centerlining of sequential segments of a road in the database.

One embodiment of this aspect of the present invention provides a method for updating an original database representing a road network. The method may generally comprise one or more of the following steps. First a baseline database comprising position data for a network of traffic arteries in a region covered by the original database may be compiled. The original database may be patched, wherein the patching comprises one or more of renaming a misnamed road in the original database, correcting grade separations between roads incorrectly shown to intersect in the database, repairing topological problems in the database, and removing incorrect flow direction elements for one-way roads in the database. A set of traces are collected such that the set of traces comprises position data for one or more vehicles traveling on one or more roads in the road network. The traces are matched to the baseline database, wherein the matching comprises discretizing the traces into fragments. Each fragment may be identified. The original database may then be aligned to a subset of the traces, wherein the aligning comprises the steps of matching traces to elements in the original database. Elements that are represented in the baseline database may be removed form the original database. Components in the baseline database are interconnected. The original database and baseline database elements may be merged and connected, wherein the merging and connecting comprises adding one or more interconnecting segments to the baseline database. Interconnecting segments may be identified, wherein the identifying comprises assigning a name and/or a function to each interconnecting segment. Debris elements may be removed from the baseline database.

The foregoing description of specific embodiments and examples of the invention have been presented for the purpose of illustration and description, and although the invention has been illustrated by certain of the preceding examples, it is not to be construed as being limited thereby. They are not intended to be exhaustive or to limit the invention to the precise forms disclosed, and obviously many modifications, embodiments, and variations are possible in light of the above teaching. It is intended that the scope of the invention encompass the generic area as herein disclosed, and by the claims appended hereto and their equivalents.

TABLE 1

Matching statistics of GPS trace to roadway graph elements

| fix # | road name | distance (m) | heading change | comment |
|---|---|---|---|---|
| 0 | CA-85 N | 0 | 0.2 | |
| 1 | CA-85 N | 0 | −0.6 | |
| 2 | CA-85 N | 0 | 0 | |
| 3 | CA-85 N | 0 | 0.2 | |
| 4 | CA-85 N | 0 | −0.4 | |
| 5 | CA-85 N | 0 | −0.2 | |
| 6 | CA-85 N | 1 | −0.7 | |
| 7 | CA-85 N | 1 | −0.4 | |
| 8 | CA-85 N | 1 | 0.3 | |
| 9 | CA-85 N | 0 | 1.7 | last fix that consistently matches CA-85 N |
| 10 | CA-85 N | 1 | 3.7 | |
| 11 | CA-85 N | 3 | 5.6 | |
| 12 | CA-85 N | 5 | 5.6 | |
| 13 | CA-85 N | 7 | 4.5 | |
| 14 | CA-85 N | 9 | 4.3 | |
| 15 | CA-85 N | 11 | 4 | |
| 16 | CA-85 N | 14 | 12.4 | |
| 17 | CA-85 N | 20 | 22.2 | |
| 18 | CA-85 N | 29 | 31.7 | |
| 19 | no match | | | |
| 20 | no match | | | |
| 21 | no match | | | |
| 22 | no match | | | |
| 24 | no match | | | |
| 25 | no match | | | |
| 26 | no match | | | |
| 27 | El Camino Real | 19 | −33.4 | |
| 28 | El Camino Real | 14 | −19.6 | |
| 29 | El Camino Real | 10 | −9.9 | |
| 30 | El Camino Real | 8 | −3.6 | |
| 31 | El Camino Real | 7 | −3.0 | |
| 32 | El Camino Real | 7 | −2.2 | |
| 33 | El Camino Real | 6 | −1.5 | first fix that consistently matches El Camino Real |
| 34 | El Camino Real | 6 | −1.0 | |
| 35 | El Camino Real | 6 | 0.1 | |
| 36 | El Camino Real | 6 | 1.0 | |
| 37 | El Camino Real | 6 | 0.7 | |
| 38 | El Camino Real | 6 | 1.0 | |
| 39 | El Camino Real | 7 | 0.6 | |
| 40 | El Camino Real | 7 | 0.3 | |
| 41 | El Camino Real | 7 | 0.1 | |
| 42 | El Camino Real | 7 | −0.7 | |
| 43 | El Camino Real | 7 | 0.1 | |
| 44 | El Camino Real | 7 | 0.8 | |
| 45 | El Camino Real | 7 | −0.1 | |

What is claimed is:

1. A method for generating an improved database representing a road network, comprising the steps of:
    recording a plurality of vehicle position data points from one or more vehicles traveling on a baseline road, such that data points for all of the available directions of travel between at least one alternate road and the baseline road are traveled by at least one of the one or more vehicles and recorded as data points;
    compiling the vehicle position data;
    connecting the recorded data points to form a semi-continuous trace of the geometric shape of the baseline road in the improved database;
    identifying a correspondence between the trace and a representation of the baseline road in an existing database that comprises road identities and/or properties; and
    assigning one or more of the identities and/or properties from the representation of the baseline road in the existing database to the baseline road representation in the improved database responsive to the identifying the correspondence step.

2. The method of claim 1, wherein the periodic data points are determined by a position determination method that uses periodic sampling.

3. The method of claim 2, wherein the position determination method comprises the step of determining the vehicle position with a global positioning system (GPS) transceiver.

* * * * *